United States Patent Office 3,423,150
Patented Jan. 21, 1969

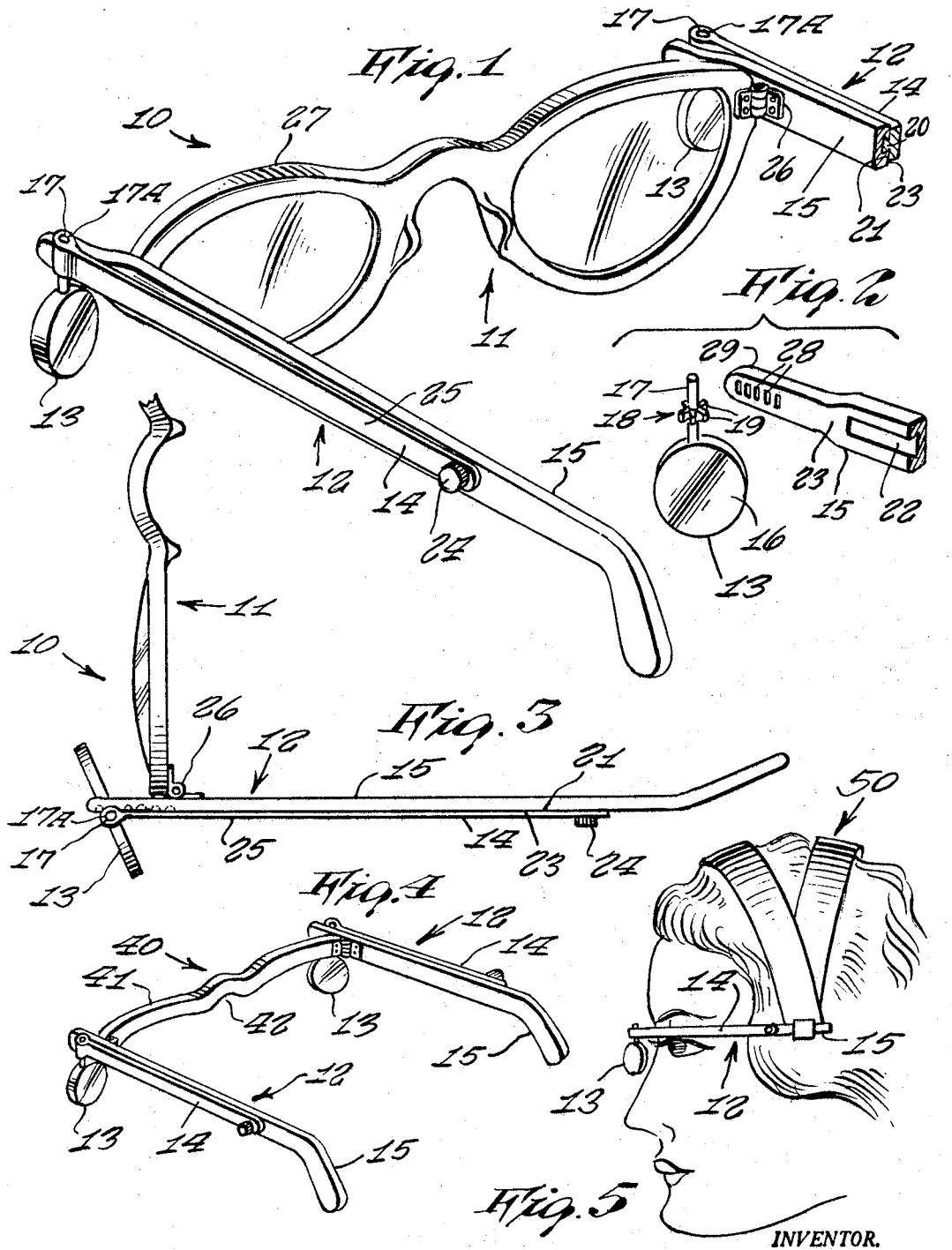

3,423,150
EYEGLASS FRAME WITH ADJUSTABLE REAR VIEW MIRRORS
Joseph A. Freed, 849 Beck St., Bronx, N.Y. 10459
Filed Aug. 23, 1965, Ser. No. 481,466
U.S. Cl. 351—50      2 Claims
Int. Cl. G02c 7/14

ABSTRACT OF THE DISCLOSURE

An eyeglass frame with a pair of viewing glasses including a mirror at each outer corner of the frame, each mirror being rotatable about a vertical axis so to allow adjustable rear viewing by a wearer of the frame.

---

This invention relates to rear view mirrors for pedestrians and others.

A principal object of the present invention is to provide a rear view mirror which can be carried on a person and which will inform him of objects at his rear and sides.

Another object is to provide a rear view mirror which will be readily adaptable for use by various persons among which are soldiers who during military action must be aware of attack from the rear by snipers; pedestrians crossing a street at an intersection who must observe turning traffic from all sides; and by persons in hazardous occupations who must know conditions at their rear such as detectives and others.

These and other objects will be readily evident upon study of the following specification and the accompanying drawing wherein:

FIGURE 1 is a perspective view of one form of the invention incorporated in a pair of eyeglasses.

FIGURE 2 is an exploded view of certain parts thereof.

FIGURE 3 is a fragmentary plan view thereof.

FIGURE 4 is a modified form of the invention, and

FIGURE 5 is a side view of still another modified form.

Referring now to the drawing in detail, the numeral 10 represents a rear view vision device according to the present invention wherein there is (as shown in FIGURES 1 to 3) a pair of eyeglasses 11 upon which there is mounted at each side a rear view unit 12.

Each unit 12 comprises a pivotable mirror assembly 13 and a sliding arm 14 which is slidable along a temple bar 15 of the eyeglasses.

The mirror assembly includes a plain, convex, or concave mirror 16 having an upstanding shaft 17 upon which a small gear 18 is formed by radially outward extending teeth 19 being stamped or forged on the mid-portion of the shaft. Shaft 17 is supported in opening 17A on the sliding arm.

The sliding arm comprises a longitudinal member having a tongue 20 on its rear side 21 which slides in a groove 22 formed on the front or outer side 23 of the temple bar.

A convenient knob 24 on the front or outer side 25 of the arm provides means for adjusting the mirror angle.

The temple bar projects forwardly beyond the mounting place of hinge 26 which supports the lens frame 27, and a plurality of indentations 28 on the outer side 23 of the projecting end 29 form a gear rack which is engaged with gear 18.

It is to be noted that in conventional eyeglass frames the temple bar is at an elevation higher than a person's eyes; thus in the present device the mirror is at eye level.

In operative use, a person wearing the glasses simply grasps the knob and moves it forward or rearwardly to adjust the mirror angle. A flashlight can be carried to light up rear objects.

In FIGURE 4 a construction 40 is shown for use by persons who do not wear glasses; and wherein each unit 12 is hingedly secured to a frontal frame 41 having a notch 42 for resting on a person's nose.

In FIGURE 5 the unit 12 is supported on a headband 50.

Obviously other forms of support may be used such as by a head band around the forehead, the shoulder, or the like.

Various changes may be made in the detail construction such changes being within the spirit and scope of the appended claims.

I claim:

1. In a rear vision mirror the combination of a frontal frame hingedly secured at each end to a rear view unit, said front frame having a notch for support over a person's nose, and each of said rear view units comprising a temple bar for support over a person's ear, a mirror assembly and a sliding arm to adjust said mirror assembly, each said mirror assembly including a mirror, an upstanding shaft, and a gear on said shaft, said shaft being pivotally supported in an opening on said sliding arm, said sliding arm having a tongue slidable in a groove on said temple bar, a hinge between said temple bars and said frontal frame, a forward projection on each temple bar, and a gear rack on each projection in engagement with each of said gears.

2. In a rear view vision mirror the combination as set forth in claim 1 wherein said frontal frame comprises an eyeglass frame.

References Cited

UNITED STATES PATENTS 2,175,896   10/1939   Jiranek _____ 351—50
2,371,196   3/1945   Swan _____ 351—50

FOREIGN PATENTS 442,782   11/1948   Italy.

DAVID SCHONBERG, *Primary Examiner.*

J. W. LEONARD, *Assistant Examiner.*

U.S. Cl. X.R.

351—156; 350—298; 2—14; 248—479